Patented Sept. 3, 1946

2,406,929

UNITED STATES PATENT OFFICE 2,406,929

CATALYST

John W. Teter, Chicago, Ill., assignor to Sinclair Refining Company, New York, N. Y., a corporation of Maine No Drawing. Application May 22, 1942, Serial No. 444,096

1 Claim. (Cl. 252—207)

This invention relates to an improved catalyst particularly effective in selectively promoting amination reactions, especially the amination of olefins by treatment with ammonia at elevated temperatures. More particularly the invention relates to a composite catalytic mass comprising metallic cobalt dispersed in or suspended on a so-called carrier.

Cobalt has previously been used as a catalyst in various chemical processes. Its use in the form of a suspension on a carrier, for instance conventional kieselguhr, has been suggested as a catalyst for hydrogenation reactions.

I have found cobalt to be a particularly effective amination catalyst. However, I have discovered that the effectiveness as amination catalysts of suspensions of cobalt on so-called carriers, particularly their effectiveness in selectively promoting the amination of olefins by ammonia at elevated temperatures in the production of nitriles, is to a large extent dependent upon the characteristics of the so-called carrier.

The amination of olefins by treatment with ammonia in the presence of a catalyst, as described in the co-pending joint application of Frank A. Apgar and the present applicant, Serial No. 289,186, filed August 9, 1939, is favorably influenced by elevated temperatures. Unfortunately, undesirable side reactions such as cracking, polymerization and hydrogenation of the olefins are also promoted by elevated temperatures. By these undesirable side reactions the olefin reactant is dissipated and the organic nitrogen compound yields of the process materially reduced.

Some of the so-called carriers upon which it has been suggested that metallic catalysts be suspended in the preparation of catalytic masses appear themselves to be active catalysts of cracking, hydrogenation or polymerization reactions. Suspensions of cobalt on some of the conventional carriers also appear to be active catalysts of these undesirable reactions. I have found that their presence in the amination reaction zone substantially promotes these competing side reactions.

It is an object of the present invention to provide an improved cobalt catalyst effective in promoting amination but which will retard or at least not materially promote competing side reactions such as previously mentioned.

The catalysts of my present invention combine both of these desirable characteristics, that is they are highly selective with respect to amination reactions. By their use in processes involving the amination of olefins at elevated temperatures, the extent to which these objectionable competing reactions occur is materially reduced.

I cannot state with certainty whether the advantageous results obtained through the use of my improved catalysts in such amination processes are due to the characteristics of the carrier per se or whether they are due to the way in which the metallic cobalt is deposited thereon by reasons of the physical and chemical characteristics of the carrier. However, I have found that cobalt catalysts similarly prepared, except for the substitution of conventional carriers are substantially less selective with respect to amination reactions than are the improved catalysts of my present invention.

I have also found that the effectiveness and selectivity of the catalyst prepared in accordance with my present invention are substantially influenced by the concentration of the cobalt catalyst present in the catalytic mass.

Not only are my improved catalysts more selective in amination reactions but they possess improved characteristics with respect to retention of their selective catalytic properties and improved characteristics with respect to their susceptibility to regeneration and to pelleting and their ability to withstand conditions of use and regeneration without objectionable crushing or disintegration of the pelleted mass.

The various materials which have previously been used or suggested as carriers for catalysts differ widely as to their physical and chemical properties. Generally, their value has been attributed to their extensive surface areas.

From my comprehensive research concerning the use in amination reactions of metallic catalysts suspended on various carriers, it appears that the effectiveness of such catalytic masses is largely dependent upon some correlation of properties of the metallic catalyst and of the carrier, not fully understood. The complexity of the problem is apparent when it is appreciated that, in addition to surface areas and chemical composition, these carriers differ as to crystalline structure, particle size, shape, densities, porosity and the size, shape and type of their cavities.

I have found that the use of carriers characterized by maximum surface areas does not necessarily result in most effective amination catalysts. The surface area of composite catalytic masses comprising cobalt suspended on a carrier is often much greater than the surface area of the carrier itself, but usually appears to depend somewhat upon the surface area of the carrier. However, I have found that a composite catalytic mass comprising cobalt and having maximum surface area is not necessarily the most effective in amination reactions. The composite catalytic mass should be so constituted as to minimize the competing reactions while exerting maximum amination activity. The improved selectivity of the catalysts of my present invention appears to result from a unique combination of the characteristics of the metallic catalysts and of the carrier.

Since catalytic masses of the type described become less active after a period of use and require regeneration to restore their activity, the susceptibility of such catalyst to regenerative treatment is of major practical importance. I have found that the susceptibility of such catalytic masses to regeneration also depends to a considerable extent upon the characteristics of the carrier.

The material which I use as the carrier or support for the cobalt catalyst in accordance with my present invention is a hydrated magnesium silicate of high purity, preferably a synthetic magnesium silicate prepared by reacting in an aqueous medium either synthetically prepared hydrated calcium silicate or a natural calcium silicate of high purity with a soluble magnesium salt, for instance magnesium chloride. Typical of such hydrated magnesium silicate which I have used with advantage is the currently commercial product, marketed under the tradename "Magnesol" by the Magnesol Company of New York, New York, in which the molar ratio of $SiO_2$ to $MgO$ is approximately 2 and which has a surface area of about 110-115 square meters per gram, as determined by the method hereinafter described. The chemical analysis of this material has been found to be approximately as follows, by weight and on the dry basis:

| | Percent |
|---|---|
| $SiO_2$ | 59.8 |
| $MgO$ | 38.1 |
| $CaO$ | 1.87 |
| $Na_2O + K_2O$ | 0.24 |

The fineness of sub-division of this material is as follows:

| Mesh size | Percent |
|---|---|
| 60 and less | 1.65 |
| 60-100 | 1.98 |
| 100-200 | 12.92 |
| 200-300 | 19.90 |
| 300 up | 62.04 |

Its bulk density is about 20 pounds per cubic foot. Though the hydrated magnesium silicate designated "Magnesol" has been used with particular advantage, it will be understood that the invention is not limited to the use of hydrated magnesium silicate of that particular composition.

The catalytic mass of my present invention may with advantage be prepared as follows: A previously filtered aqueous solution of cobalt acetate tetrahydrate is thoroughly mixed with the hydrated magnesium silicate. An aqueous solution of a precipitant such as sodium carbonate or ammonium carbonate is then added. This precipitant solution is added slowly, preferably in substantially equal parts with ½ to 1 hour stirring between additions. The final addition of the precipitant may with advantage be followed by 2 to 3 hours stirring after which the mass is allowed to settle overnight and is thereafter washed. The washing is advantageously effected by means of combined decantation and filtration, using distilled water, and, when the sodium carbonate precipitant is used, is continued until only a trace of sodium ion appears in the wash water. The washed catalyst is then dried for 24 hours or longer in a steam chest. It is then ground, screened preferably to about 8 mesh or upward and calcined at a temperature of 550° F. for about 24 hours in order to decompose the precipitated cobalt carbonates. The resulting product consists primarily of cobalt oxide supported by the magnesium silicate plus a small amount of water of hydration and undecomposed carbonates.

The suspended cobalt compound is then reduced by passing hydrogen in contact with the mass at a temperature of 650–750° F. for a period of about 12 hours.

The catalytic mass may with advantage be pelleted prior to the reduction. If desired, a pelleting agent may be used to increase the crushing strength of the resultant pellet. However, the material may be pelleted without the aid of a binder.

The proportions of the cobalt compound and of the precipitant used will depend upon the desired concentration of the metallic catalyst with respect to the carrier. For example, in the preparation of the catalyst, in accordance with my invention, containing about 43.6% cobalt, 4240 grams (17 mols) of cobalt acetate tetrahydrate is dissolved in 10 gallons of distilled water and the solution filtered to remove any insoluble residue. 1000 grams of the magnesium silicate is then added to the cobalt solution and the mixture vigorously stirred for about an hour. 2200 grams (20.8 mols) of anhydrous sodium carbonate, dissolved in 5 gallons of distilled water, is then added as a precipitant, at such a rate that about half of the carbonate solution is added over the course of 1 hour, the solution stirred for a half hour and the remaining carbonate solution added in a similar manner. The resultant catalytic mass is then stirred for an hour or so longer and allowed to stand overnight before washing.

The catalyst is thereafter washed, for instance, by a filtration and stirring process. The thin slurry may be filtered and the filtercake reslurried in 10 gallons of distilled water, the slurry refiltered and so on until the sodium content of the catalyst has been reduced to a satisfactory level. A concentration of sodium in the wash water not in excess of 1 milligram per liter, when 10 gallons of wash water is used, is deemed satisfactory.

The wet catalyst is then placed in a steam chest and dried at a temperature of about 250° F. for about 24 hours. The dried catalyst is then broken up into small lumps and calcined for about 24 hours at a temperature of 620° F. It is then ground and screened to pass a 30 mesh screen and, if desired, may be pelleted prior to reduction with hydrogen.

This material may readily be pelleted in the conventional manner without the use of a binder. However, where pellets of greater crushing strength are desired, binders may be used without substantial loss in the selective amination activity of the catalyst. For example, I have obtained very satisfactory results by the use of about 2% stearic acid and about 4% starch as pelleting agents. Rosin powder may also be used with advantage in proportions of about 4% or 5%.

These pellets after formation are dried in a stream of nitrogen for about 16 hours at a temperature of 700° F. The apparent density of the dried pellets prepared with 2% stearic acid and 4% starch has been found to be about 0.935 gram per cubic centimeter and their crushing strength has been found to range from about 4 to about 13 pounds with an average crushing value of about 8 pounds.

After the drying operation the pellets may be reduced by treatment with hydrogen as previously indicated.

The concentrations of the metal catalyst in the composite catalytic mass may be varied over a considerable range, for instance 40% to 60% by weight, but I have found concentrations approximating 50% by weight generally to have the maximum amination activity.

Generally, I have found my cobalt catalyst to be a more effective amination catalyst than a similarly prepared nickel catalyst of equal concentration. In most hydrogenation reactions, nickel has been found to be more active than cobalt. Also, when the nickel catalyst is used, there is a greater amount of cracking than occurs when my cobalt catalyst is used under similar operating conditions.

From these facts it is apparent that the ability of a catalyst to activate the N—H bond of ammonia is entirely unpredictable on the basis of the ability of such catalyst to activate the H—H bond of molecular hydrogen for hydrogenation. The two are not equivalent nor should they be expected to be equivalent when the differences in bond distance and dissociation energy of the N—H bond and the H—H bond are considered.

For the purposes of further illustrating the importance of the characteristics of the carrier used in the preparation of amination catalysts, I have tabulated below amination activities of various similarly prepared catalytic masses comprising approximately 50% cobalt suspended on various carriers. These activity values indicate total organic nitrogen fixation, calculated as laurylamine, obtained by reacting ammonia with dodecene at a temperature of 550° F. and a pressure of 2000 pounds per square inch in the presence of cobalt catalysts prepared with the carriers indicated, other conditions being comparable. Under these specified conditions the cobalt catalyst of my present invention has an amination activity of about 11.2.

| Carrier | Amination activity |
|---|---|
| Pumice | 9.1 |
| Kieselguhr (ordinary type) | 8.6 |
| Alumina | 7.3 |
| Firebrick | 6.6 |
| Iron oxide | 5.3 |
| Aluminum flouride | 2.1 |
| Aluminum silicate | 1.6 |

In addition to their superior amination activity, the catalysts of my present invention are superior to those prepared with the conventional carriers with respect to their activities in promoting competing reactions.

The effectiveness of my improved catalyst in amination reactions will be illustrated by the following specific examples of operations in which the particular catalyst used was prepared as previously described and contained approximately 50% cobalt by weight calculated as the reduced form. The hydrated magnesium silicate in powdered form had a surface area, as determined by the method hereinafter described, of 112.6 square meters per gram. This material was pelleted, after the precipitation of the cobalt thereon, with the aid of 2% stearic acid and 4% starch and the reduced pellets, on a dry basis, had a surface area of 52.9 square meters per gram. The use of this catalyst in the operation in which ammonia was reacted with propylene, at a temperature of 700° F. and a pressure of 3000 pounds per square inch, resulted in the production of total organic nitrogen compounds, calculated as propionitrile, of 14.6%, based on the weight of the propylene charged to the reaction, and about an equal proportion of non-nitrogenous polymer.

In a similar operation in which the hydrocarbon constituent of the feed stock was a crude propylene containing approximately 35% olefins, the amount of nitrogen compounds produced, on the above-stated basis, was 23.2%. In a further operation, in which a hydrocarbon containing 27.6% olefin was reacted with ammonia at a temperature of 750° F. and a pressure of 3000 pounds per square inch, the nitrogen compounds produced, based on the olefin charge and calculated as propionitrile was 19.4%.

It will be understood that the catalytic activity of my improved catalytic masses varies somewhat with the characteristics of the reactants and the temperatures, pressures and other operating conditions. Though the surface area of the composite catalyst is somewhat reduced by pelleting, the effectiveness of the catalyst in selectively promoting amination is not thereby seriously impaired.

The surface area values given herein are based on the amount of stearic acid adsorbed by the material from a benzene solution and the general assumption that the entire surface of the material is covered with a mono-molecular layer of stearic acid in such a state of orientation and packing that each molecule occupies about $20\text{A}^{\circ 2}$, as has been previously discussed rather generally in the literature. Briefly, the apparatus employed consists of a catalyst-adsorption tube having an upper and lower compartment, the latter being adapted to be evacuated and heated. A sample of the material, the surface area of which is to be measured, usually a 2 to 3 gram sample, is weighed out and transferred to the lower compartment of the adsorption tube. The tube is then weighed, heated and evacuated and the lower compartment sealed. For approximately 24 hours prior to sealing, the temperature is maintained slightly under 1000° F. and its pressure at 50–100 microns. An anhydrous solution of stearic acid in carefully purified benzene is then pipetted into the unsealed upper compartment of the tube and a thin partition separating the upper from the lower compartment of the tube broken. The stearic acid-benzene solution serves as a seal for the evacuated compartment of the tube until the solid material is well covered with the solution. The lower portion of the tube is then separated from the upper portion, tightly sealed and rotated end-over-end at the rate of about 80 R. P. M. for approximately 7 hours. It is then allowed to settle for 15 hours or more until the supernatant liquid is clear. A sample of the supernatant liquid is then removed and its stearic acid concentration compared with the concentration of the original solution. From these values the amount of stearic acid adsorbed by the solid material and the surface area of the solid material are then calculated.

The term "porosity" as used herein may be defined generally as the percentage of the total apparent volume of the material that is not occupied by the solid matter. The porosity values given were determined by the differential displacement in water and mercury, the displacements of the respective liquids being measured after the careful elimination of dissolved or occluded gases from the water and mercury and the evacuation of the material, the porosity of which was to be measured.

The catalysts of my present invention are with advantage used as a fixed bed through which an admixture of the reactants are passed or with which the reactants are otherwise brought into contact. In a process of this type I prefer to use the catalyst in a pelleted form. However, my improved catalysts are also applicable to amination processes of the type in which the catalyst in finely-divided form is passed continuously to the reaction zone in suspension in one of the reactants or a mixture thereof.

In either type of operation it eventually becomes necessary to regenerate the catalyst to restore its selective amination activity which gradually diminishes with continued use. This regeneration may readily be effected by periodically subjecting the degenerated catalyst to an atmosphere of hydrogen at a temperature of about 650° F. to 750° F., and at atmospheric pressure for about 12 to 50 hours.

I claim:

An amination catalyst comprising about 40% to 60% cobalt in suspension on a carrier of hydrated magnesium silicate in which the molar ratio of $SiO_2:MgO$ is approximately 2:1.

JOHN W. TETER.